(12) United States Patent
Mehta

(10) Patent No.: US 10,099,759 B1
(45) Date of Patent: Oct. 16, 2018

(54) AUTONOMOUS SUBMERSIBLE STRUCTURE

(71) Applicant: X Development LLC, Mountain View, CA (US)

(72) Inventor: Rohinton Mehta, Fremont, CA (US)

(73) Assignee: X Development LLC, Mountain View, CA (US)

( * ) Notice: Subject to any disclaimer, the term of this patent is extended or adjusted under 35 U.S.C. 154(b) by 81 days.

(21) Appl. No.: 15/346,327

(22) Filed: Nov. 8, 2016

(51) Int. Cl.
| | |
|---|---|
| *A01K 61/00* | (2017.01) |
| *B63G 8/00* | (2006.01) |
| *B63G 8/08* | (2006.01) |
| B63G 8/06 | (2006.01) |
| A01K 61/75 | (2017.01) |

(52) U.S. Cl.
CPC ............ *B63G 8/001* (2013.01); *A01K 61/006* (2013.01); *B63G 8/08* (2013.01); *A01K 61/75* (2017.01); *B63B 2702/12* (2013.01); *B63G 8/06* (2013.01)

(58) Field of Classification Search
CPC .............. B63G 8/001; B63G 2008/002; B63G 2008/004; B63G 2008/007; A01K 61/60; A01K 61/75; A01K 61/70
See application file for complete search history.

(56) References Cited

U.S. PATENT DOCUMENTS 3,230,967 A 1/1966 Castro

| 3,730,120 A | 5/1973 | Dobell |
|---|---|---|
| 7,320,289 B1 | 1/2008 | Clarke |
| 8,028,660 B2 | 10/2011 | Troy |

(Continued)

FOREIGN PATENT DOCUMENTS

| GB | 2493699 | 2/2016 |
|---|---|---|
| WO | WO2002/040125 | 5/2002 |

(Continued)

OTHER PUBLICATIONS

'www.worldfishing.net' [online] "Technology in waiting," Aug. 31, 2014, [retrieved on Mar. 17, 2017] Retrieved from Internet: URL<http://www.worldfishing.net/news101/Comment/ben-yami/technology-in-waiting> 3 pages.

(Continued)

*Primary Examiner* — Andrew Polay
(74) *Attorney, Agent, or Firm* — Fish & Richardson P.C.

(57) ABSTRACT

An autonomous submersible structure includes a cage for protecting cargo contained within a volume of the cage, two or more independently operated propellers, and a raised platform. The raised platform includes a plurality of sensors and computers that detect at least one of: water quality, water pressure, or objects in the vicinity of the cage. The raised platform includes a navigating system that controls a direction of travel of the cage based on feedback provided by the plurality of sensors and computers, and a power generator that provides power to the sensors, the navigating system, and the feeding mechanism. The autonomous submersible structure includes a ballast for counterbalancing the weight of the raised platform, wherein the navigating system controls the two or more independently operated propellers to alter the direction of travel of the cage, and wherein the raised platform is environmentally sealed and a portion of the raised platform is positioned above water level.

13 Claims, 2 Drawing Sheets

(56) References Cited

U.S. PATENT DOCUMENTS

| | | | |
|---|---|---|---|
| 9,469,383 | B1 | 10/2016 | Cooper et al. |
| 9,655,347 | B2 | 5/2017 | Troy |
| 9,908,593 | B2 | 3/2018 | Cooper et al. |
| 2006/0102087 | A1 | 5/2006 | Page |
| 2009/0235870 | A1 | 9/2009 | Troy |
| 2012/0006277 | A1* | 1/2012 | Troy .............. A01K 61/65 119/223 |
| 2012/0072038 | A1 | 3/2012 | Kolar |
| 2012/0192779 | A1 | 8/2012 | Teppig, Jr. |
| 2013/0206078 | A1 | 8/2013 | Melberg |
| 2014/0129031 | A1 | 5/2014 | Carter |
| 2014/0319076 | A1 | 10/2014 | Galushko |
| 2016/0007577 | A1 | 1/2016 | Constantz |
| 2016/0221186 | A1 | 8/2016 | Perrone |
| 2016/0244130 | A1 | 8/2016 | Mood |
| 2017/0295759 | A1 | 10/2017 | Hine |
| 2018/0005178 | A1 | 1/2018 | Gollu |

FOREIGN PATENT DOCUMENTS

| | | |
|---|---|---|
| WO | WO 2005/117573 | 12/2005 |
| WO | WO 2007/042861 | 4/2007 |
| WO | WO 2007042860 | 4/2007 |

OTHER PUBLICATIONS

'www.thefishsite.com' [online] "Self-Propelled Cage for Fish Farming Tested," Sep. 3, 2008, [retrieved on Mar. 16, 2017] Retrieved from Internet: URL<http://www.thefishsite.com/fishnews/7808/selfpropelled-cage-for-fish-farming-tested/> 3 pages.

'www.thefishsite.com' [online] "Self-propelled Aquaculture Cage Debuts in Culebra," Jul. 31, 2008, The Fish Site, [retrieved on Mar. 16, 2017] Retrieved from Internet: URLhttp://www.thefishsite.com/fishnews/7571/selfpropelled-aquaculture-cage-debuts-in-culebra/ 3 pages.

'www.technovelgy.com' [online] "Self-Propelled Underwater Fish Cages," Sep. 11, 2008, [retrieved on Mar. 16, 2017] Retrieved from Internet: URL<http://www.technovelgy.com/ct/Science-Fiction-News.asp?NewsNum=1871> 3 pages.

'www.seagrant.mit.edu' [online] "Self-propelled Aquaculture Cage Debuts in Culebra," Jul. 15, 2008 [retrieved on Mar. 17, 2017] Retrieved from Internet: URL<http://seagrant.mit.edu/press_releases.php?nwsID=54> 2 pages.

'www.portofentry.com' via 'web.archive.org' [online] "USA: MIT tests self-propelled cage for fish farming," Sep. 5, 2008, [retrieved on Mar. 17, 2017] Retrieved from Internet: URL<http://web.archive.org/web/20081119234732/http:/portofentry.com/site/root/resources/industry_news/6983.html> 2 pages.

'www.phys.org,' [online] "MIT tests self-propelled cage for fish farming," Sep. 3, 2008, [retrieved on Mar. 16, 2017] Retrieved from Internet: URL<https://phys.org/news/2008-09-mit-self-propelled-cage-fish-farming.html> 2 pages.

'www.newscientist.com' [online] "Mobile fish farms could soon navigate the oceans," Sep. 4, 2008, [retrieved on Mar. 16, 2017] Retrieved from Internet: URL<https://www.newscientist.com/article/dn14663-mobile-fish-farms-could-soon-navigate-the-oceans/> 3 pages.

'www.fiskerforum.dk' [online] "Self-Propelled cage tests," Nov. 20, 2008, [retrieved on Mar. 16, 2017] Retrieved from Internet: URLhttp://www.fiskerforum.dk/en/news/b/Self-propelled-cage-tests> 1 page.

'www.bizjournals.com' [online] "Maine firm, partners make moveable fish farm for deep-ocean aquaculture," Aug. 14, 2008 [retrieved on Mar. 17, 2017] Retrieved from Internet: URL<http://www.bizjournals.com/boston/blog/mass-high-tech/2008/08/maine-firm-partners-make-moveable-fish-farm.html> 2 pages.

'www.aquafeed.com' [online] "Self-propelled cage for fish fanning," Aug. 20, 2008, Suzi Fraser, [retrieved on Mar. 16, 2017] Retrieved from Internet: URL<http://www.aquafeed.com/read-article.php?id=2487&sectionid=1> 3 pages.

Lee et al., "Design of Autonomous Underwater Vehicles for Cage Aquafarms," IEEE Intelligent Vehicles Symposium, Jun. 13-15, 2007, pp. 938-943.

Office Action issued in U.S. Appl. No. 15/346,281, dated May 1, 2018, 17 pages.

* cited by examiner

AUTONOMOUS SUBMERSIBLE STRUCTURE

FIELD

This specification relates to open ocean aquaculture.

BACKGROUND

Open ocean aquaculture is a marine farming technique in which fish farms are placed offshore in the open ocean. The farms are typically positioned in deep and unsheltered waters, where ocean currents are stronger than they are inshore. A main advantage of open ocean aquaculture is the dispersion of effluent produced by the fish farms: near-shore aquaculture effluent settles below the farms on the seafloor, potentially damaging local ecosystems. Placing aquaculture in the open ocean also eases the process of obtaining permits, mitigates issues around recreational use for near-shore space, and provides more space for the farms, allowing production to expand and preventing health risks associated with overcrowding, such as injury, disease, and high mortality rates.

SUMMARY

Many open ocean aquaculture systems for growing and harvesting fish are moored or anchored to the sea floor. These aquaculture systems, typically including a submersible cage structure containing live fish, are subject to depth limitations, request robust moorings or anchors, and require a human to travel out to the location of the farm to perform maintenance, feed and monitor the fish, and eventually to harvest the fish.

In some implementations, to effectively utilize the open ocean while ensuring proper care of the live cargo of the structure, a submersible cage structure can be configured to autonomously navigate the open ocean. By using a propulsion system to traverse ocean currents and steer to certain locations, the proposed system provides a mobile aquaculture solution that reduces the need for humans to travel to the submersible cages. The proposed system is not restricted to certain depths, and can navigate to different locations based on a condition of the cargo contained within the system.

The propulsion system of the system can use propellers with large diameters, slow speed, and high efficiency to move the structure. The large and slow propellers are more efficient than typical propulsion systems using smaller propellers that rotate at a larger rotational velocity. An efficient propulsion system allows the proposed system to remain in the open ocean for an extended period of time without need for service. Additionally, efficient propulsion allows the proposed system to use a small power generation system, and thus a small environmentally sealed portion kept above water.

In one general aspect, an autonomous submersible structure includes a cage for protecting cargo contained within a volume of the cage, two or more independently operated propellers, and a raised platform. The raised platform includes a plurality of sensors and computers that detect at least one of: water quality, water pressure, or objects in the vicinity of the cage. The raised platform includes a navigating system that controls a direction of travel of the cage based on feedback provided by the plurality of sensors and computers, and a power generator that provides power to the sensors, the navigating system, and the feeding mechanism. The autonomous submersible structure includes a ballast for counterbalancing the weight of the raised platform, wherein the navigating system controls the two or more independently operated propellers to alter the direction of travel of the cage, and wherein the raised platform is environmentally sealed and a portion of the raised platform is positioned above water level.

Implementations may include one or more of the following features. For example, the navigating system can be operated internally to the raised platform. The navigating system can be operated via a communication connection to a remote server. The navigating system can be operated excluding the use of GPS data.

In some implementations, a longitudinal axis of each of the two or more independently operated propellers can be positioned in parallel with a longitudinal axis of the raised platform.

In some implementations, the cage can include a skeleton having uniformly spaced voids and a mesh netting that covers the skeleton, wherein the mesh netting has pores sized based on the cargo contained within the volume of the cage.

In some implementations, the navigating system can further control a depth in water of the cage. The navigating system can control a depth in water of the cage based on feedback provided by the plurality of sensors and computers.

In some implementations, the cage can have a spherical shape.

In some implementations, the two or more propellers can each have a diameter between 2-10% of the diameter of the cage. The two or more propellers each have a rotational velocity between 10-50 RPM.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
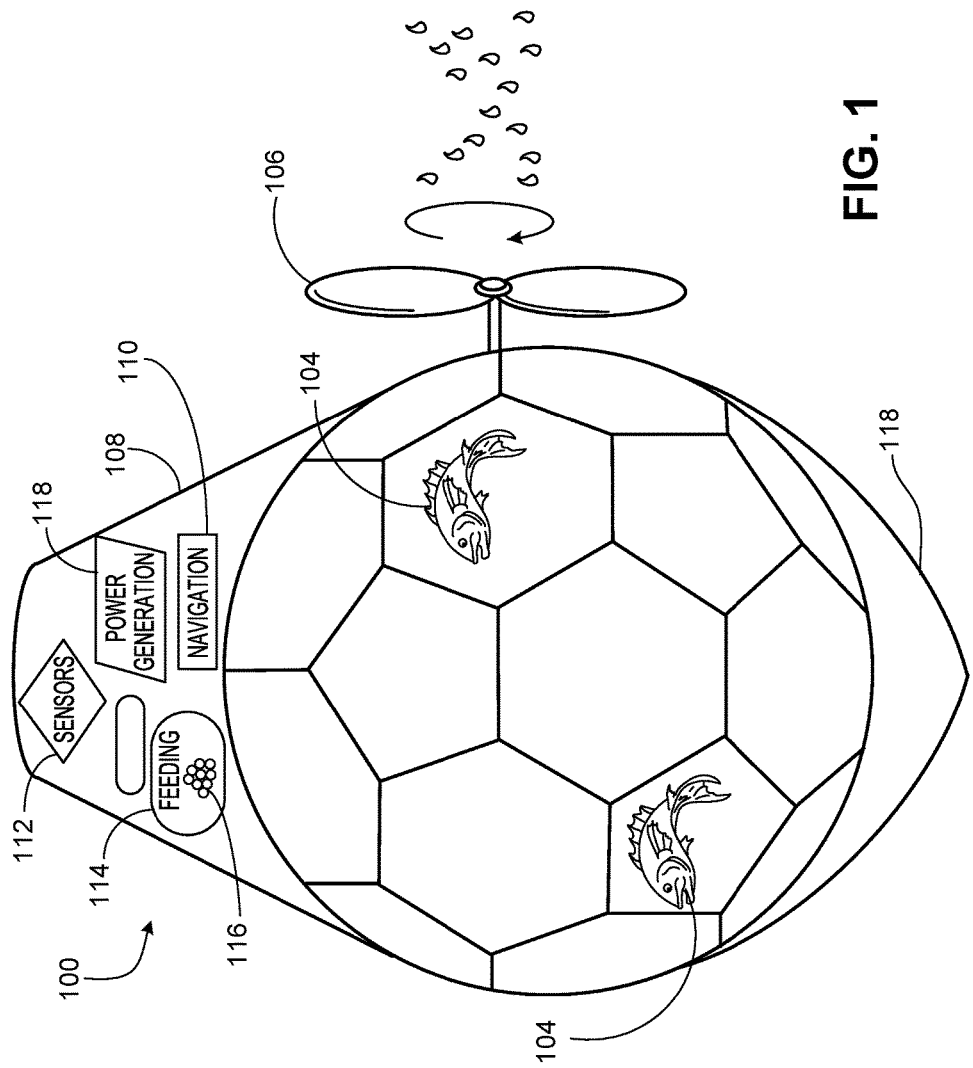
FIGS. 1 and 2 are diagrams of an example configuration of an autonomous submersible structure that contains live aquatic cargo.
Figure 2:
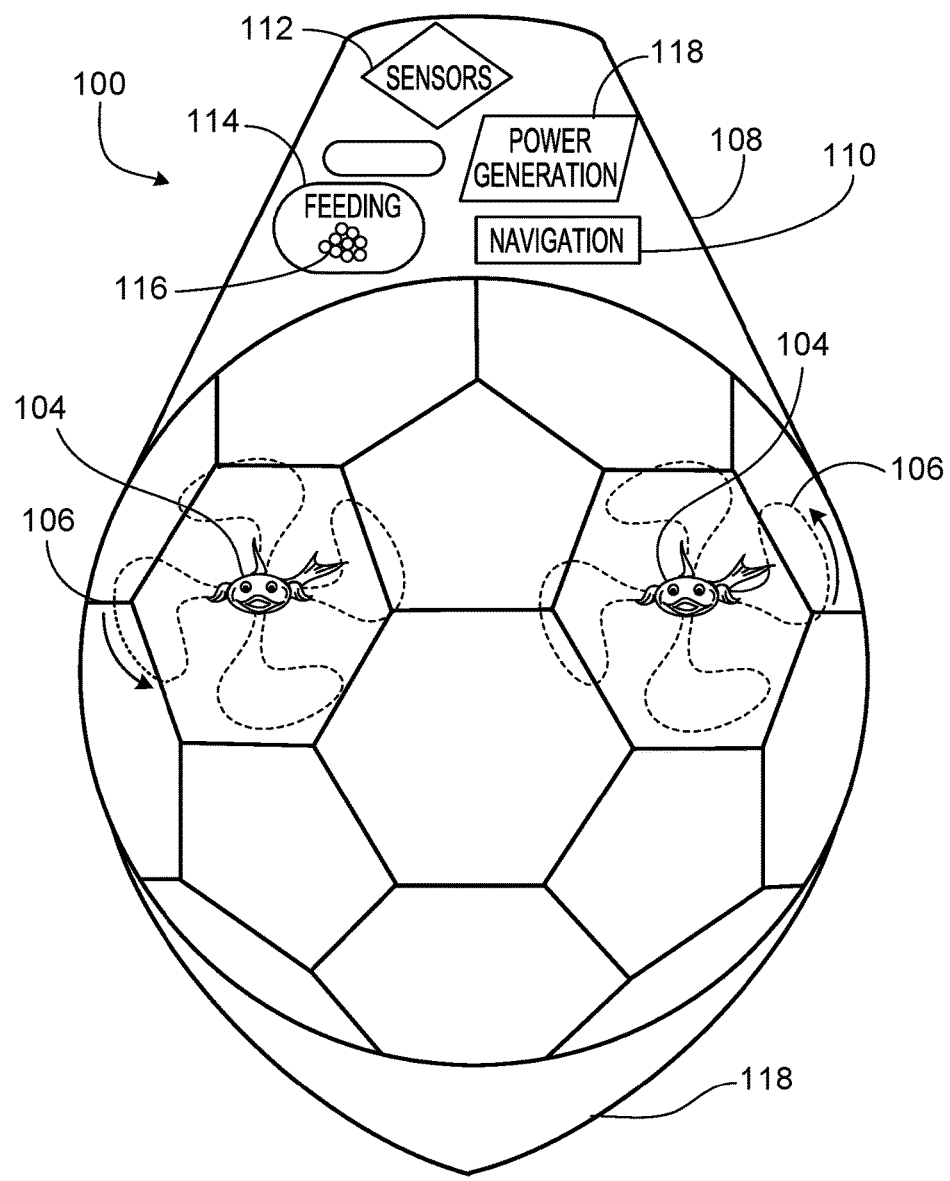

FIGS. 1 and 2 are diagrams of an example configuration of an autonomous submersible structure 100 that contains live aquatic cargo. In this example, the structure 100 is an off-shore cage that contains live fish. The structure 100 is configured to navigate, untethered, in the open ocean and to maintain predetermined conditions for the cargo contained within the structure 100 itself. In this particular example, the structure 100 is configured to navigate the open ocean and to maintain optimal water conditions for the live fish.

FIG. 1 illustrates a side view of the structure 100. FIG. 2 illustrates a front view of the structure 100. The structure 100 includes a cage 102, cargo 104, two propellers 106, a conning tower 108, a navigation system 110, a sensors and communications system 112, a feeding mechanism 114, a power generation system 118, and a ballast 120.

The structure 100 is a free-floating structure located in the open ocean configured to autonomously navigate ocean currents to certain locations. The structure 100 includes the cage 102 for containing cargo 104.

The cargo 104 can be finfish or other aquatic lifeforms. In some implementations, the cargo 104 is juvenile fish, and the length of time the structure 100 is travelling between the starting point and the destination is the length of time required for the cargo 104 to reach maturity. In some implementations, the cargo 104 can be other resources, such as fresh water, relief aid, etc.

In some implementations, the cage 102 has a skeleton covered by a mesh netting. The mesh netting covering the skeleton of the cage 102 can have holes sized based on the cargo 104 contained within the cage 102. For example, if the average size of a homogenous cargo 104 is 12 cm in diameter, the holes of the mesh netting can be 10 cm in diameter to prevent the cargo 104 from exiting the cage 102. In some implementations, the mesh netting covering the skeleton of the cage 102 is made from material that can withstand strong ocean currents, such as iron, steel, etc. In some implementations, the cage 102 does not include mesh netting, and is environmentally sealed to protect the cargo 104 from ocean water.

In some implementations, the cage 102 encompasses a volume of 3,600 ft$^3$. For example, the cage 102 can have a diameter between fifty and seventy feet. In some implementations, the cage 102 has a diameter of 63.66 feet. In some implementations, the cage 102 encompasses a different volume, such as 2,500 ft$^3$, 4,000 ft$^3$, 6,000 ft$^3$, etc., and can have a different diameter, such as twenty feet, forty feet, sixty feet, etc.

The structure 100 is propelled by propellers 106 located on the back of the cage. In some implementations, the propellers 106 are two offset propellers which allow the structure 100 to be steered, as well as change depth. In some implementations, the propellers 106 each have a large diameter relative to the size of the cage 102. For example, the propellers 106 can each have a diameter between 2-10% of the diameter of the cage 102. In some implementations, the propellers 106 each have a diameter between two meters and four meters. In some implementations, the propellers 106 each have a diameter of 3.25 meters.

In some implementations, the propellers 106 have a low rotational velocity relative to typical rotational velocities used by propellers for submersible structures. For example, the propellers 106 can each have a rotational velocity between ten and fifty RPM. For example, the propellers 106 can each have a rotational velocity of thirty RPM. In some implementations, the propellers 106 can each have a different rotational velocity, such as sixty RPM, seventy-five RPM, etc.

By using propellers with large diameters relative to the size of the cage 102 and with low rotational velocities relative to typical rotational velocities, the propulsion system of the structure 100 is more efficient than current propulsion systems on submersible structures. For example, the propulsion system of the structure 100 can be 90% efficient. The high efficiency of the propulsion system reduces the need for power, and allows the structure 100 to use smaller generators. The reduction in power needed reduces the strain on the power generation system 118 of the structure 100 and reduces the weight contained within and the size of the conning tower 108.

In some implementations, the propellers 106 have the same diameter and the same rotational velocity. In some implementations, the propellers 106 can each have different diameters or different rotational velocities.

The systems needed to steer the structure 100 and control the propellers 106 can include sensitive electronic components. In some implementations, the cargo 104 is live and requires feed that must be kept dry.

The conning tower 108 is an environmentally sealed raised platform that houses sensitive components of the structure 100. In some implementations, the conning tower 108 houses the navigation system 110, the sensors and communications system 112, and the feeding mechanism 114. The navigation system 110 and the sensors and communications system 112 can include sensors and electronics sensitive to water damage, and must be kept dry to function. The feeding mechanism 114 can include a feed bin that contains feed 116 for the cargo 104.

In some implementations, the conning tower 108 is mounted atop a supporting structure that serves as a ballast tank and provides a structural transition between the cage 102 and the conning tower 108. In some implementations, the supporting structure surrounds the base of the conning tower 108, and the takes the form of a truncated pentagonal pyramid. In some implementations, the supporting structure takes a different form, such as a dome, a pyramid having a different number of sides, etc.

In some implementations, the conning tower 108 is eight feet in diameter and twenty feet tall. In some implementations, the conning tower 108 has a different diameter of a reasonable size, such as six feet, ten feet, fifteen feet, etc. In some implementations, the conning tower 108 has a different height, such as twelve feet, fifteen feet, thirty feet, etc.

In some implementations, environmentally sealing the entirety of the conning tower 108 for the length of the journey taken by the structure 100 is not possible. In some implementations, a portion of the conning tower 108 containing the most sensitive electronic components, as well as the feed 116 is kept above water at all times.

The navigation system 110 controls the propellers 106 to steer the structure 100. The navigation system 110 is communicatively coupled to the propellers 106. In some implementations, the navigation system 110 is coupled to the propellers 106 through communication buses within environmentally sealed conduits. In some implementations, the navigation system 110 transmits control signals to the propellers 106 wirelessly through various wireless communications methods, such as RF, sonic transmission, electromagnetic induction, etc.

In some implementations, the navigation system 110 can receive feedback from the propellers 106. For example, the navigation system 110 can receive the actual rotational velocity of a propeller of the propellers 106. The navigation system 110 can use the feedback from the propellers 106 to adjust subsequent control signals to the propellers 106.

The navigation system 110 can determine a path through the ocean for the structure 100 and corresponding control signals for the propellers 106 locally. In some implementations, the navigation system 110 is communicatively coupled to the sensors and communications system 112, and uses data collected by the sensors and communications system 112 to navigate. In some implementations, the navigation system 110 is coupled to the sensors and communications system 112 through communication buses within environmentally sealed conduits. In some implementations, the navigation system 110 receives sensor data from the sensors and communications system 112 wirelessly through various wireless communications methods, such as RF, sonic transmission, electromagnetic induction, etc.

In some implementations, the navigation system 110 communicates with a remote server through the sensors and communications system 112 to receive new bearings. For example, the sensors and communications system 112 can transmit position data of the structure 100 to a remote server, which processes the data and transmits a new bearing to the navigation system 110. The navigation system 110 can receive the new bearing, process the data, and generate updated control signals for the propellers 106. In some implementations, the navigation system 110 communicates with a remote server through the sensors and communications system 112 to receive new control signals for the propellers 106.

In some implementations, the navigation system 110 can generate updated control signals for the propellers 106 locally, without communicating with a remote server. For example, the navigation system 110 can receive data from the sensors and communications system 112, process the data to determine a new bearing, and generate updated control signals for the propellers 106. In some implementations, the navigation system 112 can navigate the structure 100 without the use of GPS. For example, the navigation system 112 can navigate the structure 100 using ocean positioning data collected by the sensors and communications system 112.

The sensors and communications system 112 collects data and transmits the data to the navigation system 110. The sensors and communications system 112 monitors local water parameters, such as water temperature, salinity, pressure, etc. For example, the sensors and communications system 112 can include a temperature sensor that detects and records the temperature of the water. The sensors and communications system 112 can include sensor arrays and transducers for receiving and transmitting underwater signals for positioning in the ocean and/or communicating between structures 100 and/or with a separate sea vessel, such as a maintenance boat. For example, the sensors and communications system 112 can include sonar sensor arrays that detect the position of the structure 100 in the ocean.

The sensors and communications system 112 can include vision sensors, such as sonar, cameras, etc. that detect objects or acquire images for image analysis by the sensors and communications system 112 or a remote server. For example, the sensors and communications system 112 can include a camera that monitors the activity of the cargo 104.

In some implementations, the sensors and communications system 112 can detect objects near the structure 100. For example, the sensors and communications system 112 can use a sonar sensor array to detect objects on the ocean floor. In some implementations, the sensors and communications system 112 can detect currents near the structure 100. For example, the sensors and communications system 112 can use water temperature and pressure data to determine the boundaries of a current.

In some implementations, the sensors and communications system 112 can map out features of the ocean and the ocean floor. For example, the sensors and communications system 112 can use sonar to detect underwater mountains, canyons, etc. and transmit the data to a remote server. The sensors and communications system 112 can communicate with a remote server through various wireless methods, such as RF, sonic transmission, electromagnetic induction, etc.

The navigation system 110 can use the data collected by the sensors and communications system 112 to traverse the ocean. For example, the navigation system 110 can receive data from the sensors and communications system 112 indicating that the structure 100 is currently caught in a fast-moving current, but that the boundary between the current and calm water is 5 m below the center of the structure 100's current position. In this example, the navigation system 110 can generate control signals for the propellers 106 to sink the structure 100 below the boundary of the fast-moving current. The navigation system 112 can steer the structure 100 into or out of currents, based on the desired path of the structure 100.

The navigation system 110 can control the propellers 106 to keep the structure 100 geostationary. For example, in a storm, or other situations in which navigating conditions are suboptimal, the navigation system 110 can receive feedback form the propellers 106 and the sensors and communications system 112 to maintain a position in which the structure is to remain.

The navigation system 110 can control the propellers 106 to change a course of the structure 100. For example, if the structure 100 is called into a docking station for maintenance, the navigation system 110 can receive the coordinates of the docking station and can generate control signals for the propellers 106 to change course for the docking station.

The navigation system 110 controls the propellers 106 to steer the structure 100 based on a condition of the cargo 104. The navigation system 110 can steer the structure 100 based on sensor data received from the sensors and communications system 112 to maintain optimal water quality for the cargo 104. For example, the navigation system 110 can steer the structure 100 to maintain optimal temperature, salinity, and pH for the cargo 104, which, in this example, is salmon. In some implementations, the navigation system 110 can control the propellers 106 to steer the structure 100 based on a dispersion rate of effluent, e.g., liquid waste or sewage, produced by the cargo 104. For example, the sensors and communications system 112 can determine a dispersion rate of effluent using a vision system and transmit the data to the navigation system 110, which determines a course and velocity for the structure 100 based on the data received.

The feeding mechanism 114 contains and dispenses feed 116 for the cargo 104. The feeding mechanism 114 includes a feed bin which contains the feed 116. The feed 116 is selected based on the cargo 104. In some implementations, the feed 116 must be kept dry. In some implementations, the feed bin is pressurized with dry air to keep the feed 116 dry. The feeding mechanism 114 is communicatively coupled to the sensors and communications system 112, and uses data collected by the sensors and communications system 112 to determine feeding parameters. In some implementations, the feeding mechanism 114 is coupled to the sensors and communications system 112 through communication buses within environmentally sealed conduits. In some implementations, the feeding mechanism 114 receives sensor data from the sensors and communications system 112 wirelessly through various wireless communications methods, such as RF, sonic transmission, electromagnetic induction, etc.

The feeding mechanism 114 automatically dispenses the feed 116. In some implementations, the feed 116 is dispensed based on a rate that the feed 116 falls through the water. For example, the feeding mechanism 114 can receive water quality data and position, velocity, and directional data from the sensors and communications system 112. The feeding mechanism 114 can use the water quality data to determine the rate at which the feed 116 is released. In some implementations, the feeding mechanism 114 dispenses the feed 116 based on a feed rate for optimal growth or maintenance of the cargo 104. For example, the feeding mechanism 114 can dispense the feed 116 based on data from the sensors and communications system 112 indicating an optimal rate for growth of fish cargo 104.

The power generation system 118 provides power for each of the propellers 106, the navigation system 110, the sensors and communications system 112, and the feeding mechanism 114.

The power generation system 118 can include generators. In some implementations, the power generation system 118 can use a heat sink engine, using cold ocean water driven to deeper depths for driving its heat exchange. In some implementations, the power generation system 118 can use ocean thermal energy conversion (OTEC) to generate electric power for the various systems of the structure 100. In some implementations, the power generation system 118 can use a solar power system to generate electric power for the various systems of the structure 100. In some implementations, the power generation system 118 uses other renewable energy systems, such as wind, nuclear, etc. In some implementations, the power generation system 118 can use generators powered by resources such as natural gas. In some implementations, the power generation system 118 can be recharged when the structure 100 is serviced, or when maintenance is performed on the structure 100.

The conning tower 108 can be heavy component relative to the rest of the structure 100. Without compensation for the weight of the conning tower 108 that is above water level, the structure 100 can capsize.

The ballast 120 is a component that provides stability to the structure 100, preventing the structure 100 from keeling over. The ballast 120 remains below water level, and counteracts the effects of weight of the structure 100 above water level, especially that of the conning tower 108. In some implementations, the ballast is selected based on the weight of the conning tower 108 and the portion of the conning tower 108 that must be kept above water level.

The ballast 120 is placed at the bottom of the structure 100, and is attached to the cage 102. In some implementations, the ballast 120 is a single weight. In some implementations, the ballast 120 can be a compartment of the cage 102, and the weight of the ballast 120 can be adjusted by adding more material to the compartment. The ballast 120 can be made from heavy material, such as gravel, sand, iron, or other various materials typically used as weights.

A number of implementations have been described. Nevertheless, it will be understood that various modifications may be made without departing from the spirit and scope of the disclosure. For example, various forms of the flows shown above may be used, with steps re-ordered, added, or removed.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. An autonomous submersible structure comprising:
   a cage for protecting live aquatic cargo contained within a volume of the cage;
   two or more independently operated propellers mounted on an aft portion of the cage;
   a ballast structure that is mounted on top of the cage, the ballast structure comprising a ballast;
   a conning tower that is mounted on top of the ballast structure, the conning tower comprising:
      a feeder for dispensing feed for the live aquatic cargo into the volume of the cage, the feeder comprising a feed bin for storing the feed,
      one or more sensors that are configured to monitor activity of the live aquatic cargo contained within the volume of the cage,
      a navigation computer that transmits control signals for autonomously controlling the two or more independently operated propellers to adjust a direction of travel of the autonomous submersible structure based at least on feedback provided by the one or more sensors that are configured to monitor activity of the live aquatic cargo within the volume of the cage, and a power generator that provides power to the sensors, the navigation computer, and the feeder;

wherein, in operation, the conning tower is constructed to remain above water level and to minimize water intrusion, and the ballast is constructed to counterbalance balance a weight of the conning tower.

2. The autonomous submersible structure of claim 1, wherein the navigation computer is disposed inside the conning tower.

3. The autonomous submersible structure of claim 1, wherein the navigation computer is configured to communicate with, and receive navigation instructions from, a remote server.

4. The autonomous submersible structure of claim 1, wherein the navigation computer is configured to operate without using Global Positioning System (GPS) geolocation fixes.

5. The autonomous submersible structure of claim 1, wherein a longitudinal axis of each of the two or more independently operated propellers is positioned in parallel with a longitudinal axis of the raised platform.

6. The autonomous submersible structure of claim 1, wherein the cage comprises:
a skeleton having uniformly spaced voids;
a mesh netting that covers the skeleton;
wherein the mesh netting has pores sized based on the cargo contained within the volume of the cage.

7. The autonomous submersible structure of claim 1, wherein the cage has a spherical shape.

8. The autonomous submersible structure of claim 7, wherein the two or more propellers each have a diameter between 2-10% of the diameter of the cage.

9. The autonomous submersible structure of claim 1, wherein the two or more propellers each have a rotational velocity between 10-50 RPM.

10. The autonomous submersible structure of claim 1, wherein the live aquatic cargo comprises live fish.

11. The autonomous submersible structure of claim 1, wherein the one or more sensors that are configured to monitor activity of the live aquatic cargo contained within the volume of the cage comprise a camera for monitoring an amount of waste produced by the cargo.

12. The autonomous submersible structure of claim 1, wherein the activity of the live aquatic cargo contained within the volume of the cage comprises a rate of growth of the live aquatic cargo.

13. The autonomous submersible structure of claim 1, wherein the sensor that is configured to monitor activity of the cargo contained within the volume of the cage comprises a sonar sensor array.

* * * * *